Figure 1:
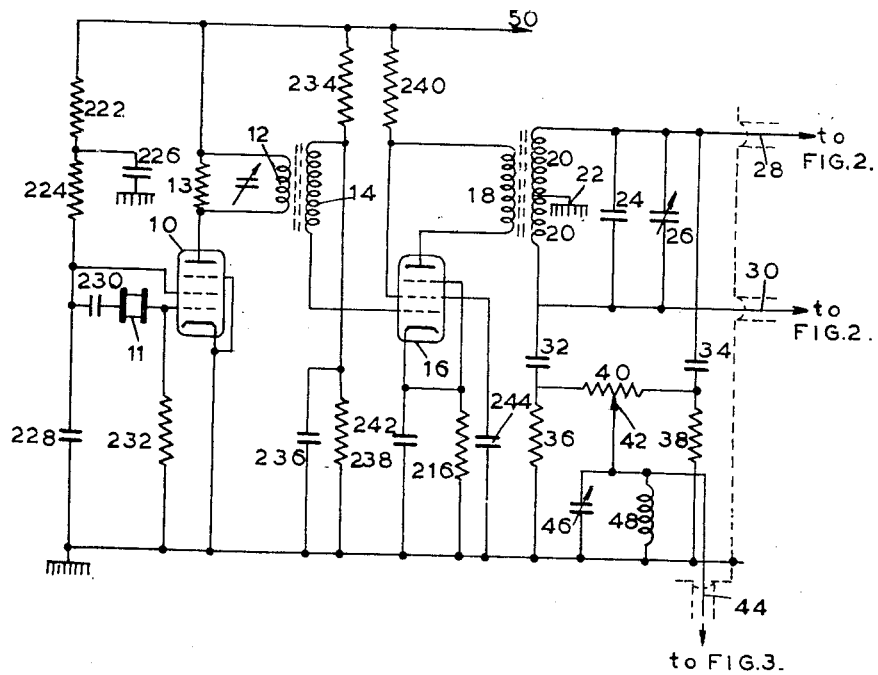

July 11, 1961

A. C. R. HAYNES 2,992,391

MEASURING AND TESTING APPARATUS

Filed Dec. 3, 1957

4 Sheets-Sheet 1

Inventor
Anthony Charles Gerald Haynes
by
Watson, Cole, Grindle & Watson
Attorneys

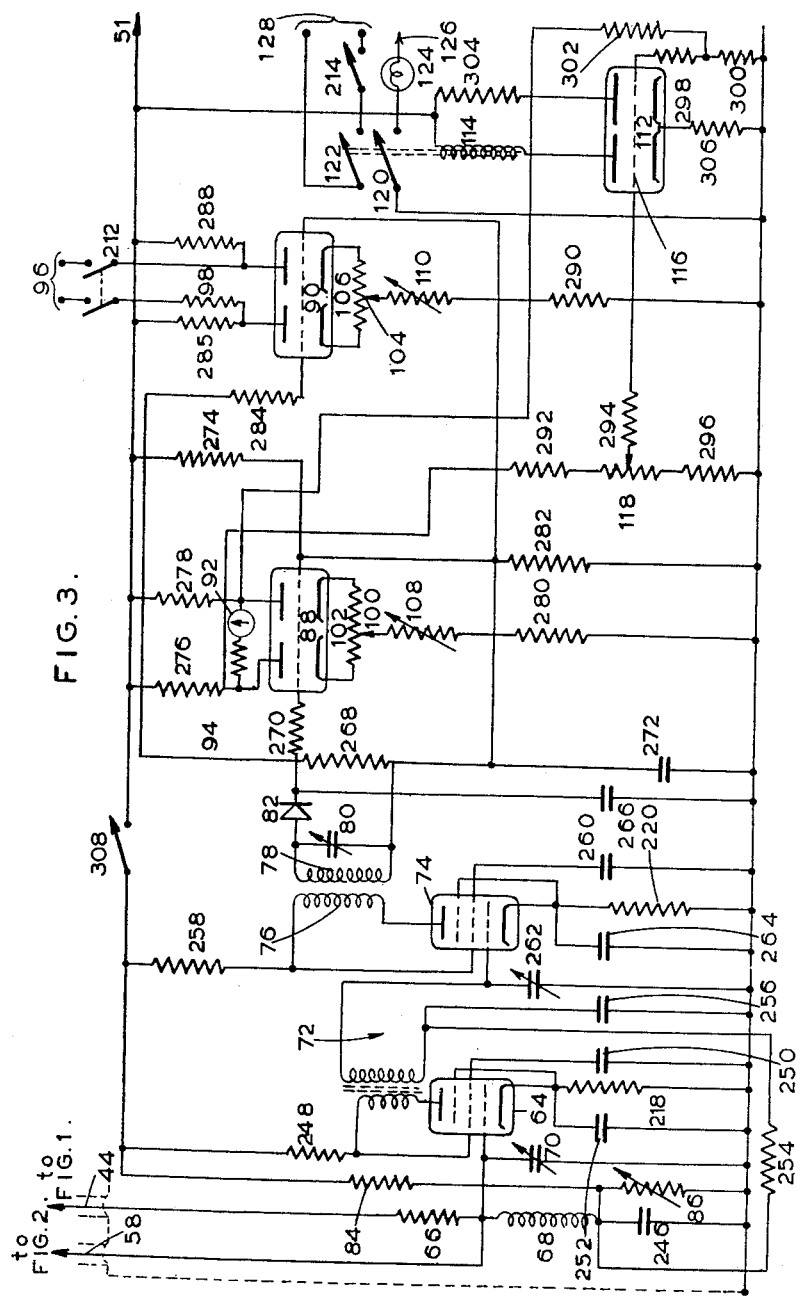

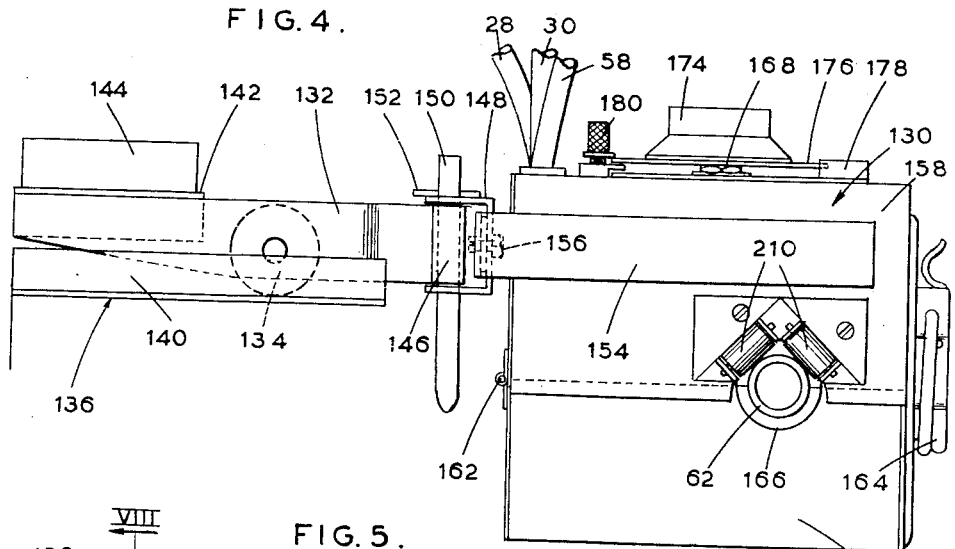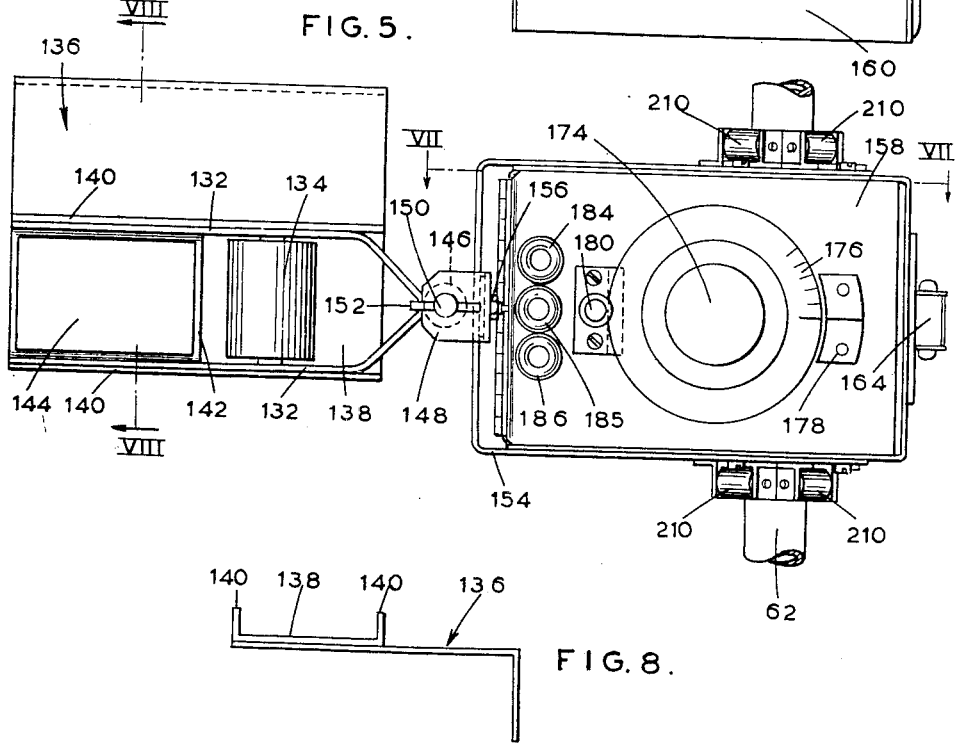

July 11, 1961   A. C. R. HAYNES   2,992,391
MEASURING AND TESTING APPARATUS
Filed Dec. 3, 1957

4 Sheets-Sheet 4

Inventor
Anthony Charles Bendell Haynes
by
Watson, Cole, Grindle & Watson
Attorneys

United States Patent Office 2,992,391
Patented July 11, 1961

2,992,391
MEASURING AND TESTING APPARATUS
Anthony Charles Rendell Haynes, Kingsbury, London, England, assignor to Haynes & Haynes Limited, Chelsea, London, England, a British company
Filed Dec. 3, 1957, Ser. No. 700,366
Claims priority, application Great Britain Apr. 26, 1957
18 Claims. (Cl. 324—61)

This invention relates to measuring and testing methods and apparatus primarily, but not exclusively, for use in the measurement, monitoring or both, of the wall thickness of elongated plastic products, such as extruded tubing composed of dielectric materials, for example plastic tubing such as polythene tubing.

An object of the invention is to provide a method of, and apparatus for providing an indication of departures from a standard dimension of the transverse dimension of an elongated plastic product, either concurrently with the process of extruding the product, or otherwise.

A further object of the invention is a method of indicating departures from a standard dimension of the transverse dimension of an elongated plastic product, for example polythene tubing, which method comprises the step of passing the product between the plates of an electric capacitor connected in series with a pre-set variable capacitor, the two capacitors forming part of a normally balanced circuit, which is supplied with radio frequency energy, rectifying the output taken from a connection between the two capacitors, after amplification as necessary, and supplying the rectified output to a responsive device such as a meter which provides an indication when said circuit becomes unbalanced due to a departure of said transverse dimension from the standard dimension.

Another object of the invention is an apparatus for carrying out the above described method, which apparatus comprises a radio frequency generator, a normally balanced circuit coupled to said generator and including two capacitors connected in series, one of said capacitors being of variable capacity, the other capacitor having plates arranged to permit passage of said plastic product between them, a rectifier supplied from a connection between said capacitors and responsive means such as a meter energised by said rectifier.

A still further object of the invention is a variable electric capacitor comprising at least two fixed plates and, for the purpose of varying the capacity of the capacitor, a cam-shaped member composed of a dielectric material movable in a plane between the plates and parallel to the planes of the plates.

The objects of the invention also include constructional arrangements and features of the apparatus above described, whereby its assembly and use are facilitated, among them the following:

(i) A method and means of mounting the capacitor plates, between which the plastic product is passed, permitting said plates to be separated to facilitate insertion of the product;

(ii) The incorporation of the two series-connected capacitors, one having plates between which the plastic product is passed and the other being variable, preferably by means of a movable cam-shaped, dielectric member- in a portable assembly housed in a screening box;

(iii) Construction of the screening box in two halves, each of which accommodates one of the plates between which the plastic product is passed, the box-halves being preferably hinged to one another;

(iv) Supporting of the screening box by means of a universal joint, enabling it to follow convolutions of the plastic product;

(v) A screening box-support comprising a counter-poised lever, connected to the screening box by the said universal joint, and pivotally mounted on a roller adapted to roll on a plane surface.

By way of example only, and without implied limitation of the scope of the invention as defined in the hereto appended claims, one embodiment of apparatus according to the invention for continuously monitoring the wall thickness of continuous tubing of plastic material, such as polythene, is hereinafter described with reference to the accompanying drawings. This apparatus consists essentially of three component units which are electrically interconnected, viz. a high-frequency generator, a device referred to as the detector head together with its mounting means, and apparatus, which receives and interprets signals from the detector head and is hereinafter referred to for brevity as the receptor unit. In the course of this description, further objects and advantages of the invention will appear.

Figure 2:
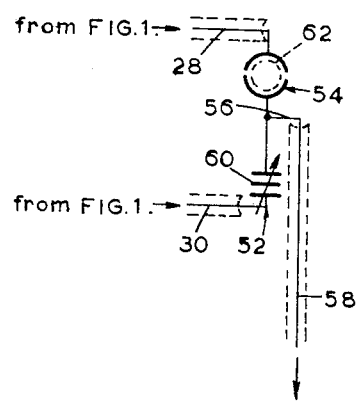
Figure 6:
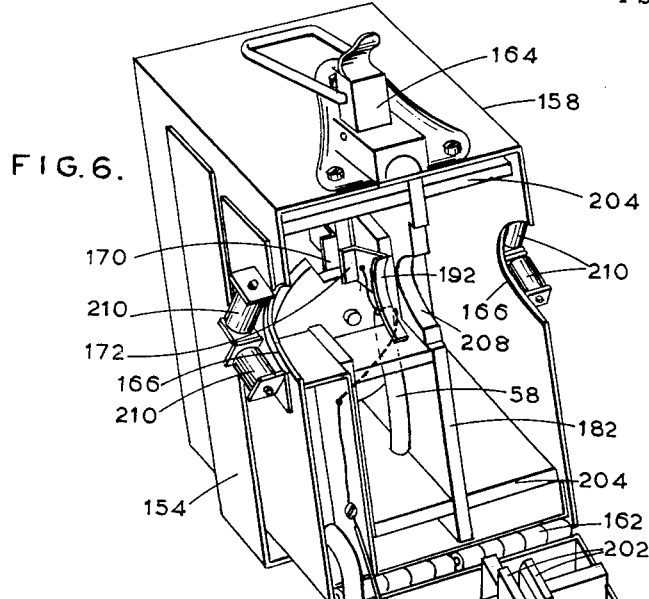
Figure 7:
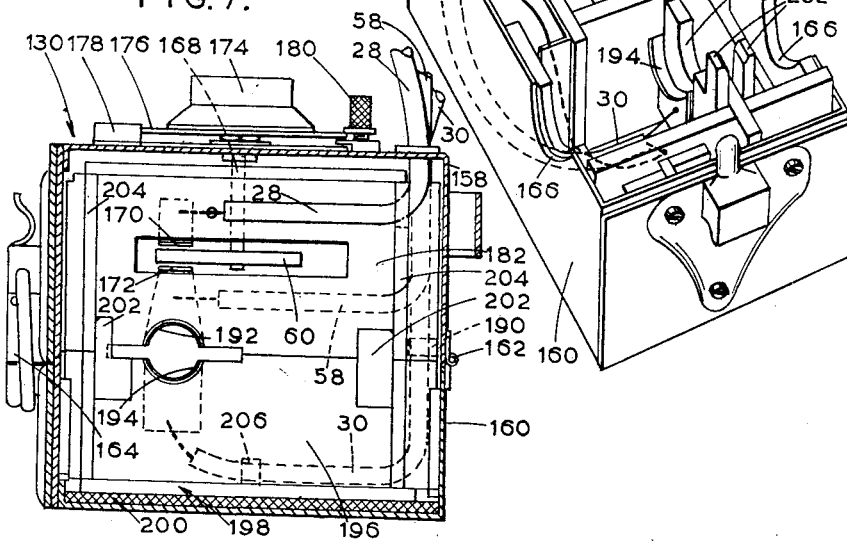

In the drawings:

FIGURE 1 is a circuit diagram of the radio-frequency generator;
FIGURE 2 is a circuit diagram of the detector head;
FIGURE 3 is a circuit diagram of the receptor unit;
FIGURES 4 and 5 are respectively a partly sectional elevation and a partly sectional plan of the detector head and its mounting means;
FIGURE 6 is a perspective view of the same showing the screening box open;
FIGURE 7 is a section on the line VII—VII of FIGURE 5; and
FIGURE 8 is a partial section on the line VIII—VIII of FIGURE 5 illustrating a detail.

The radio-frequency generator, as illustrated in FIGURE 1, comprises a pentode oscillator 10 controlled by a crystal 11 to oscillate at about 3 megacycles, and a tuned driving circuit 12, 14 feeding a pentode output stage 16, whose output coil 18 is loosely coupled to a coil 20. The crystal oscillator circuit 10, 11 is grid self-biased and the output coil 12 of the circuit is heavily damped by a resistance 13 so that the output voltage is substantially constant. Coil 20 has an earthed center tapping 22, by which the two equal halves of coil 20 are balanced about earth. Fixed and variable capacitors 24, 26 are connected across coil 20, the variable capacitor 26 serving to tune coil 20 to resonance with the oscillator 10. Coil 20 is further connected to a pair of external screened conductors 28, 30 connected to the detector head illustrated in FIGURE 2, the screening (shown in dotted lines) being earthed as shown. A phase-shifting, compensating network comprising equal capacitors 32, 34 equal resistances 36, 38 earthed as shown and a bridge resistance 40 is connected in shunt across coil 20. An adjustable tapping 42 on resistance 40 is connected to an external screened conductor 44 which is connected to the receptor unit illustrated in FIGURE 3. Tapping 42 is further connected to earth through a tuned circuit comprising a variable capacity 46 and an inductance 48. Alternatively, a variable inductance and fixed capacity could be used. The purpose of the compensating network will be described later. The complete radio-frequency generator, as illustrated in FIGURE 1, is served by a D.C. supply connected to lead 50, and accurately stabilised to a constant voltage, say 150.

Referring now to FIGURE 2, the detector head comprises capacitors 52, 54 connected in series across the external conductors 28, 30 previously mentioned, a tapping 56 on the connection between the capacitors 52, 54 being connected to an external screened conductor 58, which is connected to the receptor unit (FIGURE 3) the screening being earthed as shown in FIGURE 3. The capacity of the balancing capacitor 52 is variable by means of a rotatable middle plate 60 of dielectric material, for which purpose the material known under the trademark "Perspex" has been found eminently suitable. The plates of the measuring capacitor 54 are substantially semi-cylindrical in shape and are dimensioned to embrace without touching the tubular plastic product 62 (shown in dotted line) under examination. The capacity of capacitor 54 is dependent on the wall thickness of the tubular product 62. The construction of the detector head will be further described with reference to FIGURES 4 to 8.

The receptor unit (see FIGURE 3) served via lead 51 by a stabilised D.C. supply of the same voltage, say 150, as that of the radio-frequency generator, comprises an amplifying pentode 64, whose control grid is connected to the external conductor 58 and through a resistance 66 to the external conductor 44, the input circuit of pentode 64 being tuned by an inductance 68 and a variable capacitor 70. Pentode 64 is coupled by a tuned circuit 72 to a second amplifying stage 74, whose output is coupled by a coil 76 to the tuned circuit 78, 80 of a rectifier 82. The D.C. output of rectifier 82 is fed to the control grids of two double triodes 88, 90. A null reading meter 92 is connected, through a suitable resistance 94 between the anodes of the double triode 88 and a pair of external terminals 96 are similarly connected through a resistance 98 and a manually operable switch 212, between the anodes of the double triode 90. An adjustable tapping 100 on a resistance 102 joining the cathodes of the double triode 88 serves as a balance control to enable the meter 92 to be set to the null reading.

The external terminals 96 are intended for connection to a remotely operated continuous recording device, or other remotely operated repeater, the null setting of which can likewise be adjusted by means of an adjustable tapping 104 on a resistance 106 joining the cathodes of the double triode 90. The tappings 100, 104 are earthed through variable resistances 108, 110 respectively, which enable the currents taken by the double triodes for a given voltage applied to their control grids to be adjusted, in such a way for instance that when the last-mentioned voltage has a maximum limiting value the current through the meter 92, or through the repeater or like device connected across the terminals 96, is that required for full deflection.

If the current requirement of the repeater or like device connected across terminals 96 is substantially the same as that of meter 92, the second double triode 90 could possibly be eliminated, the terminals 96 being connected between the anodes of the double triode 88 in the same way as the meter 92. However, since it may often be desirable to switch the repeater or like device out of circuit (by means of switch 212) without disturbing the operation of the twin-triode 88 and meter 92, it is generally desirable to provide the duplicate twin-triode circuit 90, etc. If the repeater or like device requires more (or less) current than the meter, duplication of the double triode 88, with different resistances in the cathodes and anodes is essential; and if the current requirements are markedly different, the characteristics of double-triode 90 itself would have to differ from those of double triode 88. Resistance 98 serves to balance the sensitivities of the circuits 88 etc. and 90 etc. of the meter 92 and remotely operated device connected across terminals 96 respectively, and its value must be selected in dependence on the resistance of the last-mentioned device. In some cases, resistance 98 may be omitted.

The receptor circuit, as illiustrated in FIGURE 3, also includes, as an optional addition, means for operating a warning system for indicating when prescribed upper and lower limits of thickness of the plastic product being monitored are exceeded. These means comprise a a third twin triode 112, whose grids are D.C. coupled from the anodes of twin-triode 88, of which grids, one, 116, is negatively biased so that a relay 114 in the corresponding anode is inoperative when the meter 92 reads null. This grid bias is reduced as the meter 92 deflects from null until at a certain deflection the reduction of negative bias suffices to render the relay operative. A resistance control 118 in the circuit of grid 116 enables the critical meter deflection at which relay 114 becomes operative to be seletced. Relay 114, when excited, closes two ganged switches 120, 122, one of which, 120, closes a circuit from a L.T., A.C. supply lead 126 through a warning lamp 124, and the other, 122, closes a circuit through external etrminals 128 to which a remotely operated warning repeater of any convenient kind, or an automatic device as hereinafter referred to, may be connected. A manually operable switch 214 is provided for putting the repeater or other device connected to terminals 128 out of circuit.

Considering the system as a whole, the output of coil 20 (FIGURE 1) is fed, via conductors 28, 30, to the detector head (FIGURE 2) the cutput voltage of which is applied, via the tapping 56 and conductor 58 to the control grid of the first amplifying stage 64 of the receptor unit (FIGURE 3). Since the output voltage of coil 20 is split by the earthed central tapping 22, the voltages in conductors 28, 30 are equal and antiphased, so that if the capacities 52, 54 of the detector head are equalised by adjustment of the dielectric cam 60 of capacitor 52, the voltage on tapping 56 would ideally be zero; and this condition will be indicated by a null reading on the meter 92, when the balance control 100 on the cathodes of the twin triode 88 is correctly adjusted. Any departure from balance between the capacitors 52, 54, due to variation of thickness of the product 62 forming the dielectric of capacitor 54, will cause a voltage to be transmitted via conductor 58 to the control grid of the first amplifying stage 64 of the receptor unit, and this will be reflected in a D.C. output of rectifier 82, which will unbalance the anodes of the twin triode 88 and pass a current through the meter 92 causing it to deflect approximately proportionately to the degree of unbalance of the capacitors 52, 54.

In practice, some power loss in the detector head is to be expected, owing to variation in the dielectric loss of the plastic product to be examined. If uncompensated, the small voltage in phase quadrature thus transmitted, via the conductor 58, would cause the meter 92 not to read null when the capacities 52, 54 were balanced. The compensating network described with reference to FIGURE 1 effects the necessary compensation by producing a small voltage, which is of opposite phase to the power loss component and is applied via the conductor 44 and resistance 66 to the control grid of amplifier 64, the amplitude of this compensating voltage being adjustable to bring the reading of meter 92 exactly to null by means of the movable tapping 42 on resistance 40. The tuned circuit 46, 48 serves to compensate the capacity of the screened conductor 44. By slight variation of the tuning of circuit 46, 48 the phase of the compensating voltage can be corrected to exactly 90° with respect to the two equal voltages of opposed phase fed to the detector head through conductors 28 and 30 from the coil 20, and hence to exactly 180° with respect to the power loss voltage. The tuned circuit 46, 48 therefore renders the null correction control 42 entirely independent of the detector head control constituted by the variable capacity 52, 60.

The compensating network above described enables plastic products of varying dielectric loss to be monitored by the detector head.

The (H.T.) D.C. supply of the whole system is derived from a common supply comprising a transformer, a rectifier, a choke and smoothing capacitors (none of which are illustrated as being accordance with conventional practice); the output of which is fed both to the radio-frequency generator (supply lead 50, FIGURE 1) and to the receptor unit (supply lead 51, FIGURE 3) through separate neon stabiliser valves and suitable radio frequency decoupling means (again not illustrated as being in accordance with conventional practice) in order to prevent interaction between the receptor unit and the radio-frequency generator.

All the amplifying stages of the oscillation generator and of the receptor unit, viz. 16, 64, 74, are D.C. compensated by high impedance in the cathodes so that the overall gain of the generator and unit remains unaltered by minor changes of valve characteristic, and heater and D.C. (H.T.) changes. Those skilled in the art will readily appreciate that the gain of the amplifiers 16, 64, 74, which is proportional to their $g_m$'s, is held stable by means of the voltages on their grids and the voltages developed across their cathode resistors 216, 218, 220 and that this D.C. stabilisation keeps the standing currents through the amplifier valves constant, thus stabilising their $g_m$'s. The gain of the receptor unit is controllable by a potentiometer network 84, 86 (FIGURE 3) between the D.C. supply lead 51 and earth and connected through the coil 68 and the output coil of the tuned circuit 72 respectively with the control grids of both the receptor units' amplifying stages 64, 74 to hold said control grids at the same voltage, which with supply at 150 v., may be about 30 v. at full gain.

Stabilisation of the overall gain and of the output voltage of the crystal oscillator circuit, previously mentioned ensures that if the balancing capacitor 52 of the detector head is offset from the null position the reading of meter 92 will also stay constant over a period of time; and the gain control need only be checked at considerable time-intervals. Any variation of thickness of the plastic product passing between the plates of the capacitor 54 of the detector head will cause an immediate response of the meter 92, which can read "thick" or "thin" as the case may be, for which purpose it may be graduated in units of wall thickness of the plastic product and calibrated accordingly, as more fully explained hereafter in describing the method of using the apparatus.

The constructional features of the detector head will now be described.

Referring to FIGURES 4 to 8 of the drawings, the electrical components of the detector head (FIGURE 2) are mounted in a portable assembly comprising a screening box 130 supported by means of a universal joint on a counterpoised lever 132, which is in turn supported by a roller 134, which can roll on a convenient, fixed, level surface. In the example illustrated this is provided by a shelf 136 (see FIGURES 5 and 8) on the upper surface of which is secured a track plate 138 having marginal flanges 140, which serve to guide the lever 132, which is composed of two parallel vertical plates spanned at one end by a horizontal platform 142 carrying the counterpoise 144. The roller 134 is disposed between the lever plates 132 in which the ends of the roller are journalled. At the other end the lever plates 132 are bent inwards to converge at the universal joint, which comprises a vertical tube 146 permanently secured to the converging ends of the lever plates 132, a vertical stirrup 148 hinged to the tube 146 by a loose pin 150 having a cotter 152 to prevent it from falling out, and a horizontal yoke 154 looped through the stirrup 148 and connected thereto by a horizontal pivot pin 156, the screening box 130 being mounted between and rigidly attached to the limbs of the yoke. Sufficient clearance is left between the yoke and stirrup to allow a limited degree of rotation of the yoke and screening box on the pivot pin 156. The screening box can easily be separated from the lever 132 by withdrawing the loose pin 150.

The screening box 130, which is generally rectangular in plan and elevation, is made in two roughly equal halves 158 and 160 which meet on a horizontal parting plane and are hinged together by a horizontal hinge 162. A quick release toggle-catch 164 serves to hold the two halves together when the box is closed. The yoke 154 is secured to the top half 158 of the box. The side walls of the two halves of the box have semicircular cut-outs, which register mutually when the box is closed to form circular openings 166, whose centers are aligned parallel to the axis of hinge 162.

Substantially in the middle of the upper wall of the top half 158 of the screening box is journalled a vertical spindle 168, carrying the "Perspex" cam 60, which is movable between the fixed plates 170, 172 of the capacitor 52, previously mentioned with reference to FIGURE 2, to vary the capacity thereof. On the outside of the screening box, the spindle 168 carries an operating knob 174 and a graduated dial 176, which is readable against an indicator plate 178 fixed to the upper face of the screening box 130, which also carries a small locking screw 180 frictionally engageable with the edge of the dial 176 to clamp it. For calibration purposes, the dial 176 may be rotationally shiftable on the spindle 168 or the indicator plate shiftable, circumferentially of the dial, on the top of the screening box. In either case, any conventional means (not illustrated) may be used for locking the dial or indicator plate in the shifted position. The capacitor plates 170, 172 are mounted on an insulating partition 182 extending across the inside of the top half 158 of the screening box perpendicularly to the axis of the hinge 162. The screened conductors 28, 30, 58 (see also FIGURE 2) are led into the screening box through openings 184, 186, 188 in the upper wall of its top half 158, conductors 28, 58 being connected respectively to the plates 170 and 172. Conductor 30 is clipped at 190 to the back wall of the top half 158 of the screening box near the hinge 162 and is led into the bottom half 160 of the box.

Of the two semi-cylindrical plates (of the capacitor 54, see FIGURE 2) between which the tubular plastic product 62 is to be continuously passed, one, 192, is integral with the plate 172 in the top half 158 of the screening box and is accurately located coaxially with the semi-circular cut-outs constituting the upper halves of openings 166 in the side walls of the box. The other such semi-cylindrical plate 194 is mounted on an insulating partition 196 extending perpendicularly to the axis of hinge 162 and formed in a loose insulating tray 198 which fits into the bottom half 160 of the screening box and rests on a mat 200 of plastic sponge. When the screening box is closed the elasticity of mat 200 holds the upper edge of the insulating partition 196 flush against the lower edge of the insulating partition 182 of the top half 158 of the screening box. In addition, lugs 202 fixed to the lower partition 196 closely engage the upper partition 182 on either side and also closely engage endwise other partition members 204 in the top half of the screening box, so as to suppress any lateral or end play between the partitions 182 and 196 when the screening box is closed, thus ensuring accurate mutual registration of the semi-cylindrical plates 192, 194. The screened conductor 30 is clipped at 206 to the base of tray 198 and is connected to the plate 194. Being flexible, the conductor 30 does not interfere with the opening and closing of the screening box 130. The partitions 182, 196 have mutually registering cut-outs 208, to accommodate the tubular plastic product.

The top half 158 of the screening box carries on each of its side walls a pair of external rollers 210 disposed gable-wise above the openings 166. These rollers stand just proud of the openings 166, as viewed along the common axis of the openings, so that when the plastic tubular product 62 is in position for monitoring, as shown in FIGURES 4 and 5, the rollers 210 rest tangentially on the product and not only prevent the product from fouling the edges of the openings but maintain it concentric with the openings. The counterpoise 144 is supported loosely or adjustably on its platform 142 so that the balancing of the screening box 130 can be adjusted. When in use, the screening box should be underbalanced just enough to ensure that its rollers 210 maintain contact with the tubular product 62, without imposing on the latter any serious mechanical loading.

To facilitate disconnection and reconnection of the detector head assembly from and to the generator receptor unit, the screened conductors 28, 30 and 58 may terminate in coaxial plug- or socket-connectors.

The method of using the apparatus will now be described. The null reading of the meter 92 and of the repeater or like device connected to the terminals 96 must first be adjusted, by switching off the D.C. supply of the radio frequency amplifier stages 64, 74 of the receptor unit by means of a switch 308 (FIGURE 3), and adjusting the cathode balancing resistances of the twin-triodes 88, 90, until the meter 92 (and the repeater device) read zero; after which the switch 308 is closed to connect the radio frequency amplifier stages 64, 74 to the D.C. supply lead 51.

Assuming now that it is desired to use the apparatus to monitor the thickness of a production run of extruded polythene tubing concurrently with the extrusion thereof, a specimen tube of correct thickness and free from surface imperfections is first introduced into the detector head and the balance capacitor 52 is adjusted until the meter 92 reads zero. A mark on the fixed indicator plate 178 should then correspond with a mark on the dial 176 between the "high" and "low" limit marks, located by previous calibration of the detector head with correct high and low limit dimension tubes. If any correction is necessary it may be done by shifting the dial or the indicator plate and re-locking the same, as previously described. The knob 174 and dial 176 are then rotated a little to cause a slight reading on the meter scale and the tuning controls at the output of the radio frequency generator and at the input of the first amplifying stage of the receptor unit are tuned for maximum deflection. The production tube is now passed through the detector head continuously and at any time the thickness may be measured by turning the knob 174 to obtain a null reading of the meter and the thickness in comparison with the high and low limits can be read directly on the scale of the dial 176. It may here be explained that when the cathode balance of the twin-triode 88 is correctly adjusted, a null reading on meter 92 indicates that the rectified output from rectifier 82 and consequently the input voltage from the detector head, compensated for power loss, is zero, and hence that the capacitors 52, 54 of the detector head are perfectly balanced. Changes of thickness of the product passed between the plates 192, 194 of the measuring capacitor 54, will cause a current to pass through meter 92 causing it to deflect and the direction of this current will be the same irrespective of whether the thickness error of the product is positive, i.e. "too thick," or negative, i.e. "too thin." Consequently the meter 92 cannot itself distinguish between errors on the thick side and errors on the thin side, if the balance capacitor 52 of the detector head is initially adjusted, by the knob 174, to give a null reading on the meter 92 with a specimen tube of correct thickness in the measuring capacitor 54 of the detector head. When, therefore, a deflection of the meter 92 indicates a thickness error, the sign of this error (+ or —) must be determined by the sense (clockwise or counter-clockwise) in which the knob 174 has to be turned to bring the meter back to null, and the magnitude of the error by the angle through which the knob must be so turned as indicated by the dial 176.

If, however, the balancing capacitor 52 is initially adjusted to be slightly out of balance with the measuring capacitor 54 when a correctly dimensioned specimen tube is in the latter, so that the meter 92 is taking a current and giving a reading which is not null, then a deviation from standard thickness of the product passed between the plates of the measuring capacitor 54 will increase or decrease the unbalance of the capacitors 52, 54 according as the deviation is positive (too thick) or negative (too thin) (or conversely depending on the algebraic sign of the initial unbalance). In one case, therefore, the reading of meter 92 will increase and in the other will decrease by an extent representative of the magnitude of the thickness error, and the meter can accordingly be graduated in units of wall thickness of the product to be monitored as previously mentioned. However, if the meter 92 is to be used for direct measurement in this way, a more elaborate preliminary setting-up is necessary. For one thing, the sensitivity of the meter must be accurately adjusted by adjustment of the variable resistance 86 which alters the D.C. voltage at the grids of the amplifying pentodes 64, 74, thereby altering the gain. The foregoing explanation and directions for use of course apply in a similar way to the use and adjustment of the duplicate twin-triode circuit 90 etc. for operating a remotely controlled device through terminals 96.

Any appropriate steps may be taken to correct undesirable variation in thickness of the extruded tube which, after an initial cooling, passes through the detector head and is then immersed in a further cooling bath prior to being wound on to a storage drum. Normally, a certain degree of tension on the tube is applied during the winding, and such tension may be increased if it is found that the extruded tubing is too thick. The terminals 128 (FIGURE 3) may be connected to a device operative to effect automatic adjustment of the tension applied to the tubing after extrusion, or otherwise to bring about automatic compensation by any known method.

Although in the particular application of the invention described reference has been made to the monitoring of the thickness of plastic tubing, the thickness of solid plastic extruded rod may also be so monitored. Again, by appropriate modification of the shape of the plates 192, 194 of the capacitor 54 (FIGURES 2, 4 and 6) plastic products of other than circular cross-section may be monitored. Whatever the cross-section however, it is essential that the product should be presented to the detector plates in a positively guided and constant manner.

While, in the particular construction of detector head described, the cam 60 is said to be of "Perspex," another material of greater permittivity could be used and this would increase the range of possible capacity variation. The material of the cam should, however, be of a similar nature electrically to that of the material being measured. On this assumption, one setting of the power loss compensating network adjustment will hold true, or substantially true, for the whole range of capacity variation to be detected.

In the circuit described a generator frequency of three megacycles per second is referred to, this frequency being particularly suitable having regard to the considerations involved, particularly that of desirable sensitivity. For the same level of amplification obtained with the circuit described, the use of an oscillator frequency lower than three megacycles per second would necessitate an increase in the size of the capacitor plates in the detector head with consequential smaller response to rapid changes of tube dimensions.

An oscillator frequency higher than three megacycles per second may be used when measurement of very small capacities is involved, but the dielectric loss, where materials other than polythene are monitored would be higher. Thus, when it is desired to monitor plastics of poorer insulating quality than that of polythene, it may be found preferable to work at lower rather than higher frequencies and it is possible to operate with frequencies down to 100 kilocycles per second. On the other hand, because of the lower sensitivity, a higher level of amplification must be employed to obtain satisfactory monitoring readings.

Certain details of the circuit illustrated in FIGURES 1 to 3, e.g. various resistances, capacities and connections of screening and suppressor grids, have not been described in detail, and some of them are not identified by reference characters, because they are in accordance with conventional practice, as will be well understood by those skilled in the art, who are competent to vary such details in accordance with general or particular requirements, without thereby departing from the scope of the invention as defined in the hereto appended claims. However, preferred values of certain of these resistances and capacities are given in the sub-joined Tables I and II.

Table I

| Unit | Item | Reference character | Value |
|---|---|---|---|
| Oscillation generator FIGURE 1). | Capacities | 24 | 15 pf. |
| | | 26 | 25 pf. |
| | | 32, 34 | 2 pf. (each). |
| | | 226 | 0.03 µf. |
| | | 228 | 140 pf. |
| | | 230 | 100 pf. |
| | | 236, 242, 244 | 0.1 µf. (each). |
| | Resistances | 13 | 3.3 KΩ. |
| | | 36, 38 | 100Ω (each). |
| | | 40 | 1 KΩ. |
| | | 216 | 33 KΩ. |
| | | 222, 240 | 1 KΩ. (each). |
| | | 224 | 10 KΩ. |
| | | 232 | 47 KΩ. |
| | | 234 | 470 KΩ. |
| | | 238 | 100 KΩ. |

Table II

| Unit | Item | Reference character | Value |
|---|---|---|---|
| Receptor unit (FIGURE 3) | Capacities | 70, 80, 262, 266 | 100 pf. (each). |
| | | 246, 250, 252, 256, 260, 264, 272 | 0.1 µf. (each). |
| | Resistances | 66, 300 | 1 MΩ (each). |
| | | 84, 274, 292, 302 | 220 KΩ (each). |
| | | 86, 254, 268, 270, 284, 294, 298 | 100 KΩ (each). |
| | | 94, 98 | 20 KΩ (each). |
| | | 102, 106 | 500Ω (each). |
| | | 108, 110 | 5 KΩ (each). |
| | | 118 | 250 KΩ. |
| | | 218, 220 | 4.7 KΩ (each). |
| | | 248, 258 | 1 KΩ (each). |
| | | 276, 278, 286, 288 | 47 KΩ (each). |
| | | 280, 290 | 10 KΩ (each). |
| | | 282 | 56 KΩ. |
| | | 296 | 750 KΩ. |
| | | 304 | 2.2 KΩ. |
| | | 306 | 12 KΩ. |

Moreover, the detail of the apparatus illustrated in the drawings has been primarily devised, and its use explained, for the purpose of continuously monitoring the wall thickness of an extruded tubular plastic product concurrently with the extrusion thereof, this being the main application of the invention as at present contemplated. It is nevertheless capable of or/and adaptable for other uses, within the scope of the appended claims, as already mentioned.

The apparatus, as illustrated and previously described, includes no means for varying or adjusting the shape and dimensional characteristics of the detector head assembly. The incorporation of such means, within the scope of the hereto appended claims, is within the competence of those skilled in the art, but it is conceived that, for the purposes of the main application of the invention herein envisaged and above mentioned, having regard to the fact that normal production runs of continuous, extruded, tubular, plastic products amount to many thousands of feet, it is more economical to provide a separate detector head assembly tailored to each particular production run, rather than an universal detector head with interchangeable or mechanically adjustable parts rendering it adaptable to the monitoring of products of differing shape and dimensions; and notably so in view of the need for high dimensional precision, especially of the capacitor plates between which the product is to pass, and of the risk of loss of such precision inseparable from a mechanically adjustable structure, or one with interchangeable elements.

I claim:

1. A portable "detector head" assembly for detecting (in association with a radio-frequency generating circuit producing two equal antiphased voltages and an amplifying receptor circuit including indicator means, not included in the assembly herein defined) variations of thickness of an elongated, e.g. extruded, plastic product, e.g. tubular, said assembly comprising a screening box, and in said box a first (called the "measuring") capacitor composed of two plates shaped to embrace closely without touching said plastic product, a second variable, capacitor comprising, in addition to two fixed plates, a variable dielectric constituted by a rotatable cam-shaped member of dielectric material, and a series electrical connection between said capacitors; three external electrical connectors, the first and second of which are respectively connected to those plates, which are not electrically interconnected, of said two capacitors, the third being connected to said series connection, a spindle journalled in one part (normally the top part) of the wall of said screening box and carrying said cam-shaped member, external means, e.g. a knob, for rotating said spindle; opposite parts of the wall of said screening box having openings aligned with said measuring capacitor for admitting said product, means external of said screening box for indicating rotational deflections of said spindle and cam-shaped member from a datum position; and means for flexibly supporting said screening box (on a convenient structure not included in the assembly herein defined).

2. A detector head assembly as defined in claim 1, said last-named means including a normally horizontally disposed lever, universal joint means connecting said lever to said screening box, a lever-supporting roller adapted to roll on a level surface (not included in the combination herein defined) and lever counterpoise means.

3. A detector head assembly as defined in claim 2, in which said universal joint means includes an easily detachable joint member, e.g. a withdrawal pin, facilitating easy separation and reconnection of the screening box and lever.

4. A detector head assembly as defined in claim 1, further including roller means mounted externally on said screening box adjacent said openings and engageable tangentially and in rolling contact with said plastic product to guide the same, relatively to the screening box, in correct alignment with the plates of said measuring capacitor and without fouling the edges of said openings.

5. A detector head assembly as defined in claim 1, in which the screening box is in two parts separable on a plane intersecting said openings and hingedly interconnected, the hinge axis being parallel to the line connecting the centers of said openings, the two plates of the said measuring capacitor being mounted respectively in one and in the other of said two parts.

6. A detector head assembly as defined in claim 1, in which the screening box is in two parts separable on a plane intersecting said openings and hingedly interconnected, the hinge axis being parallel to the line connecting the centers of said openings, one plate of said measuring capacitor being mounted in the first of said parts, the assembly further including a loose tray fitting snugly in the second of said parts and providing a mounting for the other plate of said measuring capacitor, an elastic mat supporting said tray, and interengaging means on said tray and said first part of the screening box for ensuring accurate mutual registration of the plates of said measuring capacitor when said screening box is closed.

7. A detector head assembly as defined in claim 1, in which the screening box is in two parts separable on a plane intersecting said openings and hingedly interconnected, the hinge axis being parallel to the line connecting the centers of said openings, the two plates of the said measuring capacitor being mounted respectively in one and the other of said two parts, said screening box further including a quick release catch for fastening its two halves together in the closed position.

8. A detector head assembly as defined in claim 1, including means for clamping said spindle and cam-shaped member in a selected position.

9. Apparatus for detecting transverse dimensional variations of an elongated dielectric product, e.g. extruded polythene tubing, comprising an input circuit, a detector circuit, and an output circuit; said input circuit including a crystal-controlled oscillator tube, e.g. pentode, of radio-frequency, i.e. at least 100 kc., a driving circuit, an amplifying stage fed by said driving circuit, and a transformer in the output of said amplifying stage; said detector circuit comprising, together with the secondary of said transformer, a grounded center tapping on said secondary, a tuning capacitor connected across the ends of said transformer-secondary, and two other capacitors, viz. a measuring capacitor and a pre-settable, variable reference capacitor connected in series across the ends of said transformer-secondary, said detector circuit thereby constituting a single bridge circuit, which is tuned to resonance with the input circuit and the amplitude of whose output at the series-connection between the measuring and reference capacitors varies according to the degree of capacity unbalance, if any, of the measuring and reference capacitors; said output circuit comprising a first amplifying stage having a control grid receiving the output from said series-connection, a second amplifying stage, a rectifying network, and means for amplifying and detecting the output of said network; the apparatus further including a portable detector head comprising a screening-box containing said measuring and reference capacitors and manually adjustable means for varying the capacity of the reference capacitor, said box having aligned openings through which the elongated product can be progressed, and the measuring capacitor having plates so disposed in said box that its principal electrostatic field is traversed by part at least of the cross-section of said product; together with external, flexible, screened leads connected respectively to said measuring and reference capacitors and the series-connection between them and thus forming parts of the detector and output circuits.

10. The combination defined in claim 9, including further a power-loss-compensating network connected across said secondary of said transformer and comprising two earthed, balanced capacities, a bridge resistance, a movable tapping thereon, and a screened conductor providing a connection between said tapping and the third named of said external connectors of the detector head assembly, said last-named connection including a fixed resistance.

11. The combination defined in claim 10, including further a variably tuned inductance/capacity circuit connected between said movable tapping and earth.

12. The combination defined in claim 9 wherein said rectifier network includes a rectifier and said amplifying and detecting means includes a twin triode, one of whose grids is connected to said rectifier, a connection between the anodes of said twin-triode, said connection containing indicating means, such as a meter, responsive to potential difference between said anodes, and means for adjusting the cathode balance of said twin-triode, such as a bridging resistance between the cathodes of said twin-triode and a movable, earthed tapping on said last-named bridging resistance.

13. The combination defined in claim 12, further including a common, stabilised D.C. supply to the crystal-controlled oscillator valve, the several amplifying stages and the said twin-triode, self-biasing means for the crystal-controlled oscillator valve, damping means in the output circuit of said last-named valve for stabilising its output voltage, and a controllable potentiometer network connected between the D.C. supply and earth and having a middle tapping connected to the control grids of the first and second amplifying stages of the receptor circuit, all said amplifying stages having high impedances in their cathodes, whereby they are D.C. compensated, said potentiometer network serving to control, and in conjunction with the said common, stabilised D.C. supply to stabilise the overall gain of the whole combination.

14. The combination defined in claim 12, further including a second twin-triode, similar and similarly connected to the first mentioned twin-triode, and external terminals (for connection to a remotely controlled device) connected to the anodes of said second twin-triode.

15. The combination defined in claim 12, further including another twin-triode, means for feeding the grids thereof from the output of said first mentioned twin-triode, a relay in one of the anodes of said other twin-triode, means negatively biasing one grid of said other twin-triode to render said relay normally inoperative but rendering it operative when said negative bias is reduced by a critical amount corresponding to a critical minimum output of said first-mentioned twin-triode, an independent circuit and switch means therein actuable by said relay when operative.

16. A portable detector head assembly for detecting, in association with a radio frequency generating circuit producing two equal antiphased voltages and an amplifying receptor circuit including indicator means, transverse dimensional variations of an elongated, e.g. tubular, product of dielectric material; said assembly comprising a screening box having mutually aligned openings in opposite walls thereof for admitting said product; and disposed in said box a first or measuring capacitor composed of two plates shaped and positioned with respect to said openings so that part at least of the cross section of said product, when admitted through said openings, lies within the principal electrostatic field and so constitutes part at least of the dielectric of said measuring capacitor; a second, variable capacitor comprising two fixed plates and a displaceable member whose position determines the capacity of said variable capacitor; and a series electrical connection between said capacitors; three external electrical connectors, the first and second of which are respectively connected to those plates, which are not electrically interconnected, of said two capacitors, the third being connected to said series connection, and external means, e.g. a knob, operatively connected to said displaceable member for displacing the same; said screening box being made in two parts hinged to one another and the parting between said two parts intersecting both said openings.

17. The apparatus set forth in claim 9 in which the crystal-controlled oscillator tube is self-biased and in which the driving circuit includes a heavily damping resistance connected across it for stabilizing its output voltage.

18. The apparatus set forth in claim 9 in which the oscillator tube is of high frequency of the order of 3 mc.

References Cited in the file of this patent

UNITED STATES PATENTS

| | | |
|---|---|---|
| 2,008,713 | Hayes | July 23, 1935 |
| 2,285,152 | Fireston | June 2, 1942 |
| 2,535,026 | Anderson | Dec. 26, 1950 |
| 2,574,261 | Hagan | Nov. 6, 1951 |
| 2,588,702 | Cornelius | Mar. 11, 1952 |
| 2,657,352 | Sink | Oct. 27, 1953 |
| 2,724,273 | Sontheimer | Nov. 22, 1955 |
| 2,805,371 | Dye | Sept. 3, 1957 |

OTHER REFERENCES

Gambrill: "Controlling Extrusion of Foam Plastic on Wire," Electronics, April 1955, vol. 28, No. 4, pp. 144–145.